(12) United States Patent
Zätterqvist

(10) Patent No.: US 6,568,292 B1
(45) Date of Patent: May 27, 2003

(54) INDEXING MECHANISM

(75) Inventor: Christer Zätterqvist, Uppsala (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 09/857,407

(22) PCT Filed: Nov. 30, 1999

(86) PCT No.: PCT/SE99/02221

§ 371 (c)(1),
(2), (4) Date: Aug. 28, 2001

(87) PCT Pub. No.: WO00/32954

PCT Pub. Date: Jun. 8, 2000

(30) Foreign Application Priority Data

Dec. 2, 1998 (SE) ................................................ 9804157

(51) Int. Cl.⁷ ......................... F16H 19/00; B23B 29/24; F16D 11/06; F16D 11/00
(52) U.S. Cl. ......................... 74/319; 74/813 R; 192/28; 192/71
(58) Field of Search ............... 74/319, 813 R, 74/322; 192/22, 28, 46, 71

(56) References Cited

U.S. PATENT DOCUMENTS

| 1,166,457 | A |   | 1/1916 | Higgins, Jr. |
| 1,900,957 | A |   | 3/1933 | Stanley et al. |
| 2,589,665 | A | * | 3/1952 | Bradley ........................ 192/28 |
| 3,466,939 | A | * | 9/1969 | Almvide ........................ 192/28 |
| 3,584,722 | A | * | 6/1971 | Albrile ...................... 400/213.1 |
| 3,712,433 | A | * | 1/1973 | Thut ............................ 192/28 |
| 3,785,465 | A | * | 1/1974 | Johansson ............... 192/104 C |
| 4,029,184 | A | * | 6/1977 | Kindig et al. ................. 192/28 |
| 4,158,944 | A | * | 6/1979 | Rabinow .................. 192/17 R |
| 4,281,748 | A | * | 8/1981 | Winiasz ..................... 192/148 |
| 4,854,522 | A | * | 8/1989 | Brown et al. ............ 242/385.2 |

FOREIGN PATENT DOCUMENTS

GB          846579         8/1960

* cited by examiner

Primary Examiner—Sherry Estremsky
Assistant Examiner—Tisha D. Lewis
(74) Attorney, Agent, or Firm—Connolly Bove Lodge & Hutz LLP

(57) ABSTRACT

A method and a device are provided for achieving a step-by-step feeding, based on a rotary shaft which optionally can be made to execute one or more well-defined, whole rotation turns. The step-by-step feeding is achieved by mechanical connection between a driver joined to an output shaft and the inner periphery of a drive drum directly driven by a drive motor and arranged concentrically relative to both the driving and the driven shaft. The system is based upon the driver being adjustable between a first driving position and a second locked position.

7 Claims, 2 Drawing Sheets

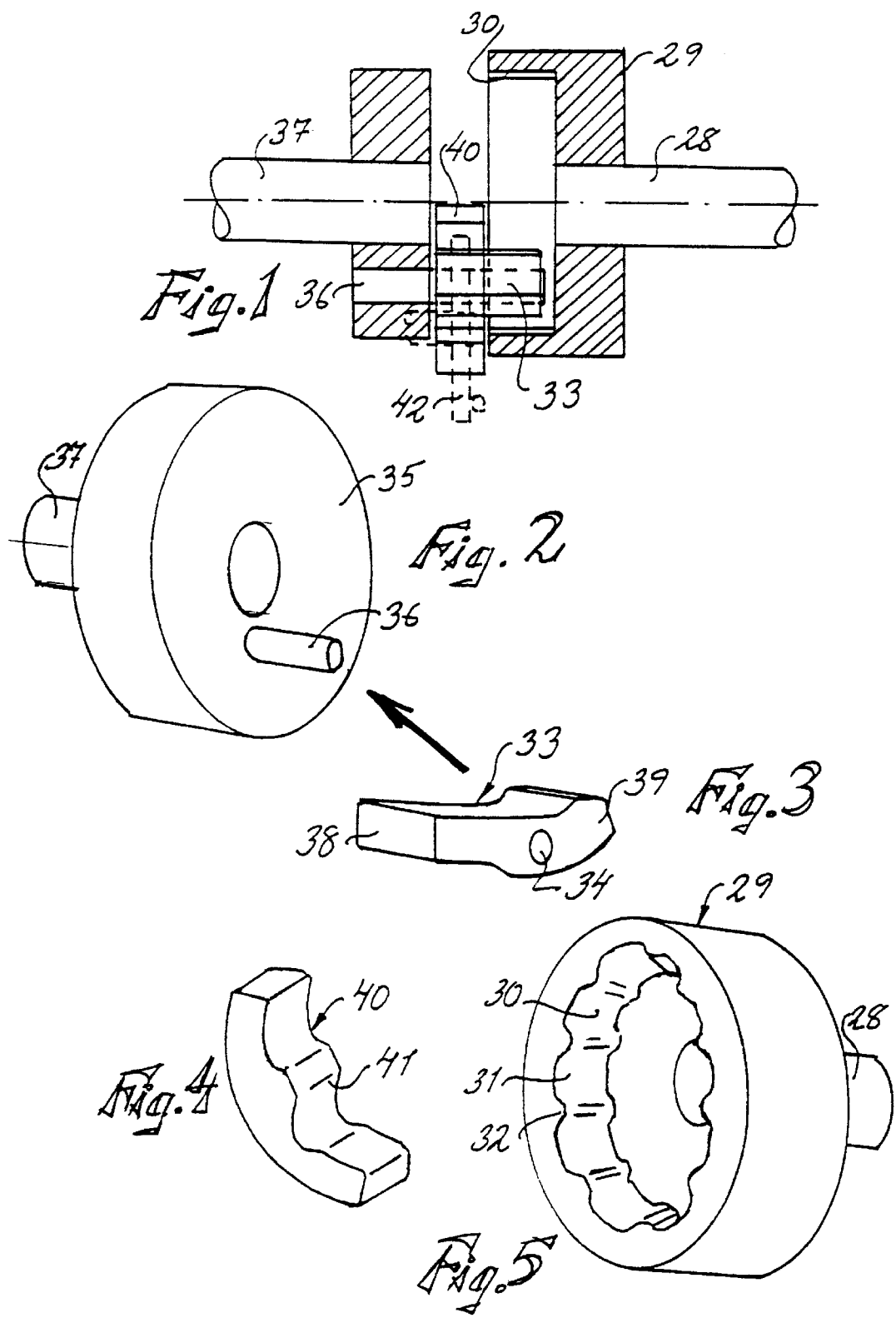

INDEXING MECHANISM

BACKGROUND OF THE INVENTION

The present invention relates to a method and a device for achieving step-by-step feeding by a rotary shaft, comprising one or more well-defined whole turns for the shaft in question. This basic indexing can then be converted by means of direct-acting gear units into parts of a rotation turn for a secondary shaft or shorter or longer rectilinear motions for an optional component. In the latter case, transmitted via a gear rack or equivalent.

SUMMARY OF THE INVENTION

The indexing mechanism in question has a number of advantages which make it usable even under harsh conditions. It is thus dynamically balanced, which means that its indexing is independent of external vibrational and gravitational influence, which in turn make it usable in, for example, accessories to modern combat aircraft. It further requires very little space to transmit high torques and, last but not least, it has high repeatability and it is very precise by virtue of the fact that the indexing is effected through mechanical connection and disconnection of, in principle, a single part in a single, precisely defined position.

The working of the indexing mechanism in question incorporates the feature that one or more turns of the rotation of an input shaft is/are relayed as indexing to a second output shaft. By choosing the number of turns which are required to be extracted from the output shaft, a number of different indexings can therefore be obtained. This gives the indexing mechanism in question a very high degree of flexibility.

The step-by-step feeding or indexing is thus achieved according to the invention by mechanical connection between a rotary input motor shaft and a driver, which is in turn connected to a second output shaft which is in line with the motor shaft but totally detached from this, and this second output shaft, following connection, imitating the rotation of the motor shaft for one or more full turns, wholly dependent upon the setting, so as thereafter to be disconnected and braked with immediate effect. According to a preferred embodiment of this system, the motor shaft is directly connected to a cylindrical drive drum arranged concentrically about the same, which drive drum is provided internally with a fluting in the form of grooves or cavities against which a driver which is adjustable between two different positions can be connected and disconnected. In its normal position, the driver, which is thus connected to the second output shaft, is held by an eccentric in engagement with a system-fixed stop lug. As soon as the eccentric is readjusted so that its influence upon the driver ceases, the driver will enter into engagement position against the flutes of the drive drum and will accompany the latter for one or more full turns so as, as soon as the latter re-establishes contact with the eccentric, to be disconnected from the drive drum and with its opposite end enter into engagement with the stop lug, whereupon the latter and the output shaft are simultaneously sharply braked. The sole control unction which is required in this system, over and above the purely mechanical control of the connection and disconnection of the eccentric, is a delay between the activation command and the connection of the driver, which gives the motor time to reach full speed before the driver is coupled together with the drive drum. In those cases in which the drive motor is always switched on, there is obviously no need for any delay whatsoever. It is additionally required that the eccentric shall have been returned to its original position before the driver has completed the intended number of turns.

The driver which is characteristic of the device according to the invention is mounted tiltably about a crankshaft arranged parallel with or vertical to the output shaft and somewhat eccentrically relative to the same, while the driver itself extends at a tangent transversely to this shaft, about which it is tiltable between its two working positions, i.e. alternatively with its end edge facing towards the rotational direction of the motor and in bearing contact against the fluted inner side of the drive drum or with its end edge facing in the rotational direction of the motor and in bearing contact against the fixedly disposed brake lug. In order to tilt over the driver from its position in bearing contact against the fluted inner side of the drive drum, in which position it can be held by, for example, a spring, into its other locked position in which its other end bears against the brake lug, the aforementioned mechanically adjustable eccentric, disposed in a fixed mounting directly beyond the outer edge of the drive drum, can preferably be used, by means of which the driver can be forced over into its other position. For this, the eccentric quite simply lifts the particular end of the driver out of its engagement with the fluting of the drive drum, whereupon the front end of the driver in the rotational direction encounters the stop lug. The fact that the eccentric has a fixedly disposed mounting and the drive drum and the driver, when the latter is connected, rotate about the shafts in question means that the driver and the eccentric have one contact possibility per turn.

BRIEF DESCRIPTION OF THE DRAWINGS

The invention has been defined in the subsequent patent claims and shall now be somewhat further described in connection with the appended figures, in which:

FIG. 1 shows a section through the indexing function

FIGS. 2–5 shows the main parts of the indexing function and

DETAILED DESCRIPTION OF THE INVENTION

Figure 6:
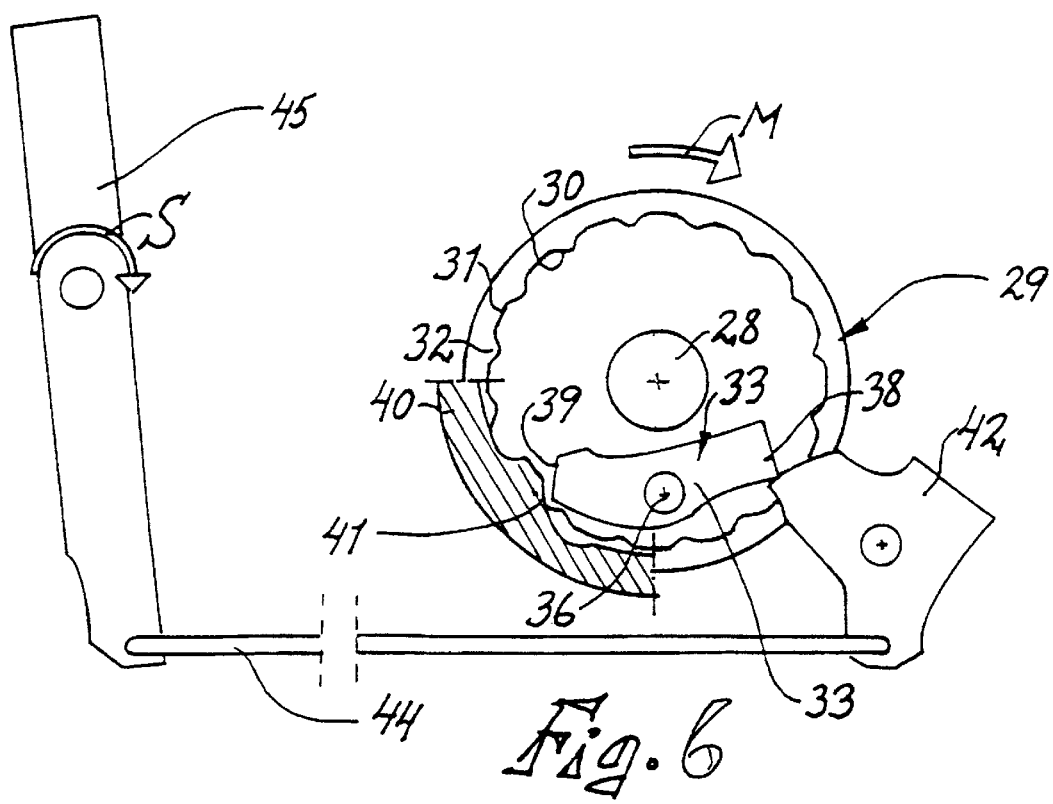
FIG. 6 shows the main parts of the indexing function in braked position.

The indexing mechanism referred to here comprises a drive drum 29 directly connected to the drive shaft 28 for a drive motor. This drive drum, in turn, has an internal cylindrical surface 30 provided with a considerable number of "cavities" 31 separated by banks 32.

Further included in the indexing mechanism is a driver 33, which, via a continuous shaft hole 34, is connected to a driver disc 35 by a cylindrical shaft 36. secured in the latter. The driver disc 35 has an output shaft 37, which lies in line with the shaft 28 but which is detached from this. The driver 33 has a drive edge 38, which, in the mounted state, faces towards the cavities 31 of the drive drum 29, and a brake edge 39 facing in the opposite direction.

Between the drive drum 29 and the driver disc 35 there is further disposed an immovable brake calliper 40, which, as can be seen from FIG. 6, has a brake lug 41 against which the driver 33 can be brought to bear by an eccentric 42 likewise disposed between the drive drum 29 and the driver disc 35. The driver 33 is provided internally with a spring (not visible in the figures), which endeavours to rotate it about the shaft 36 in the direction of the arrow E.

Figure 7:
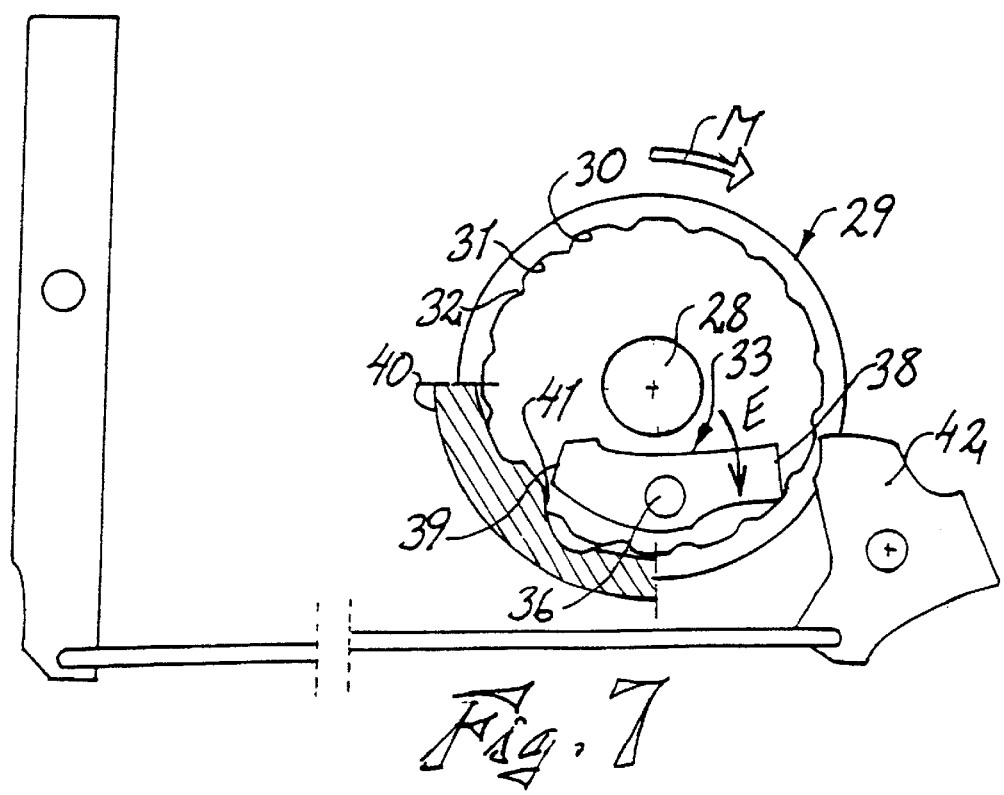
FIG. 7 shows the indexing function once indexing has started.

The eccentric 42 is adjustable by means of a and a control lever 45 between the original rest position shown in FIG. 6 and the start position shown in FIG. 7.

Whenever an indexing is to be carried out, the motor which drives the feed drum 29 is started and once the motor has reached full working speed in the direction of the arrow M the control lever 45 is actuated in the direction of the arrow S, whereupon the eccentric 42 releases its grip against the driver 33, the latter being tilted in the direction of the arrow E by the spring (not shown in the figure), whereby the drive edge 38 of the driver is brought into bearing contact with the nearest cavity/cam 31/32 in the drive drum 29 at the same time as the stop edge 39 disposed in the other end of the driver is tilted away from its bearing contact against the stop lug 41 and, with this, the driver 33 takes the driver disc 35 and the shaft 37 with it in its hereupon commenced rotary motion about the shaft 37. As soon as the eccentric 42 has let the driver 33 pass, it will be returned to its original position if indexing of just one turn is required, which means that as soon as the driver 33 has completed a turn it will slide up onto the eccentric 42 and will hence be disconnected from the drive drum 29 at the same time as its brake edge 39 is brought to bear against the brake edge 41 of the brake calliper 40 which produces a direct rotational halt for the shaft 37.

This device thus provides very precise indexing which always yields one or more full feed turns. This precise indexing in the form of one or more feed turns can then be converted via a direct-acting gear unit to any form of desired feed motion.

What is claimed is:

1. An indexing mechanism for step-by-step feeding by a system comprising a rotary input shaft which is driven by a motor and which is arranged to be mechanically coupled with an output shaft for one or more full turns, said indexing mechanism comprising:

a driver capable of coupling the input shaft in-line with the output shaft;

a drive drum arranged concentrically about the input shaft;

a driver shaft arranged parallel to the input shaft, wherein the driver is joined to the input shaft by the driver shaft, wherein the driver is adjustable between a first position and a second position about the driver shaft by means of an eccentric, wherein in the first position a first end of the driver bears against cavities in an inner periphery of the drive drum, and wherein in the second position a second end of the driver is connected with a fixedly disposed stop lug thereby bringing the output shaft to an immediate stop.

2. An indexing mechanism according to claim 1, wherein the driver is joined to the output shaft, and wherein between the drive drum and the output shaft there is a space in which the stop lug is fixedly housed and the eccentric is movably disposed.

3. Indexing mechanism according to claim 1, wherein it comprises a control command system which, when an order is given for indexing, starts the motor which drives the drive drum in order, as soon as the motor has come up to speed, to connect the driver by means of the eccentric against the inner side of the drive drum so as to return to the starting position before the drive drum has completed the last of the desired number of turns in order after the return to the starting position, when the driver reaches the stop lug, to apply sharp braking to the output shaft.

4. An indexing mechanism according to claim 1, wherein the driver is joined to the output shaft by a driver disc which is arranged at some distance from and parallel with the outer edge of the drive drum and is joined to the output shaft running transversely to the driver, wherein the driver shaft is tiltably mounted between the first and second positions in which the driver extends in one direction substantially at a tangent transversely to the output shaft and parallel with and along the driver disc, and extends in another direction perpendicularly to the one direction over the distance between the driver disc and the drive drum and into the drive drum, and wherein the eccentric and stop lug are disposed in a clearance between the driver disc and the drive drum.

5. Indexing mechanism according to claim 2, wherein it comprises a control command system which, when an order is given for indexing, starts the motor which drives the drive drum in order, as soon as the motor has come up to speed, to connect the driver by means of the eccentric against the inner side of the drive drum so as to return to the starting position before the drive drum has completed the last of the desired number of turns in order after the return to the starting position, when the driver reaches the stop lug, to apply sharp braking to the output shaft.

6. An indexing mechanism according to claim 2, wherein the driver is joined to the output shaft by a driver disc which is arranged at some distance from and parallel with the outer edge of the drive drum and is joined to the output shaft running transversely to the driver, wherein the driver shaft is tiltably mounted between the first and second positions in which the driver extends in one direction substantially at a tangent transversely to the output shaft and parallel with and along the driver disc, and extends in another direction perpendicularly to the one direction over the distance between the driver disc and the drive drum and into the drive drum, and wherein the eccentric and stop lug are disposed in a clearance between the driver disc and the drive drum.

7. An indexing mechanism according to claim 3, wherein the driver is joined to the output shaft by a driver disc which is arranged at some distance from and parallel with the outer edge of the drive drum and is joined to the output shaft running transversely to the driver, wherein the driver shaft is tiltably mounted between the first and second positions in which the driver extends in one direction substantially at a tangent transversely to the output shaft and parallel with and along the driver disc, and extends in another direction perpendicularly to the one direction over the distance between the driver disc and the drive drum and into the drive drum, and wherein the eccentric and stop lug are disposed in a clearance between the driver disc and the drive drum.

* * * * *